(12) United States Patent
Mastie et al.

(10) Patent No.: US 9,513,859 B2
(45) Date of Patent: Dec. 6, 2016

(54) SYSTEMS AND METHODS FOR REPOSITIONING ON USER DEFINED BOUNDARIES IN A PRESENTATION DATA STREAM

(75) Inventors: Lynn M. Mastie, Longmont, CO (US); Scott D. Mastie, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 2133 days.

(21) Appl. No.: 11/613,068

(22) Filed: Dec. 19, 2006

(65) Prior Publication Data
US 2008/0143169 A1    Jun. 19, 2008

(51) Int. Cl.
*G06F 15/00* (2006.01)
*G06F 3/12* (2006.01)

(52) U.S. Cl.
CPC .......... *G06F 3/1285* (2013.01); *G06F 3/1205* (2013.01); *G06F 3/126* (2013.01); *G06F 3/1211* (2013.01)

(58) Field of Classification Search
USPC ....................................................... 358/1.18
See application file for complete search history.

(56) References Cited

U.S. PATENT DOCUMENTS

| | | | |
|---|---|---|---|
| 4,630,198 A * | 12/1986 | I-Yuan | 711/118 |
| 6,456,732 B1 | 9/2002 | Kimbell et al. | |
| 6,571,054 B1 * | 5/2003 | Tonomura et al. | 386/241 |
| 6,909,525 B1 | 6/2005 | Sato | |
| 7,756,865 B2 * | 7/2010 | Condon et al. | 707/722 |
| 2002/0181021 A1 | 12/2002 | Stephens | |
| 2003/0056177 A1 * | 3/2003 | Nara et al. | 715/525 |
| 2003/0076512 A1 | 4/2003 | Laughlin | |
| 2004/0057064 A1 | 3/2004 | Stringham | |
| 2006/0050313 A1 * | 3/2006 | Hashimoto et al. | 358/1.15 |
| 2006/0136442 A1 * | 6/2006 | La Rosa Ducato et al. | 707/101 |
| 2006/0136820 A1 * | 6/2006 | Uchida | 715/526 |
| 2006/0168560 A1 * | 7/2006 | Pandey | 717/106 |
| 2007/0024901 A1 * | 2/2007 | Kayama | 358/1.15 |
| 2007/0236723 A1 * | 10/2007 | Gaertner et al. | 358/1.15 |
| 2007/0242282 A1 * | 10/2007 | Hashimoto | 358/1.2 |

* cited by examiner

*Primary Examiner* — Mark Milia
(74) *Attorney, Agent, or Firm* — Duft Bornsen & Fettig LLP

(57) ABSTRACT

Systems and methods for repositioning processing of presentation data stream by a presentation device from user defined boundaries. A user may define customizable boundaries, such as mail-piece boundaries when printing mail, chapters when printing books, as well as additional boundaries that logically group or divide a data stream. The user defined boundaries are inserted into the presentation data stream. The operator does not need to guess or go through trial and error processes to determine the reposition point of the data stream. Rather, features and aspects herein allow repositioning of processing of the data stream to occur from user defined boundaries that result in the data stream reposition occurring at uniform restarting points of the data stream. This allow existing repositioning capabilities such as those provided by z/OS 'backspace' and 'forward space' commands to always land on a mail piece or other appropriate boundary.

14 Claims, 8 Drawing Sheets

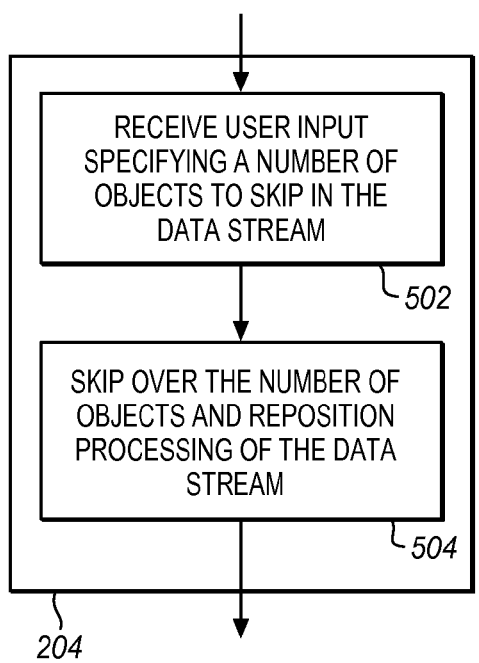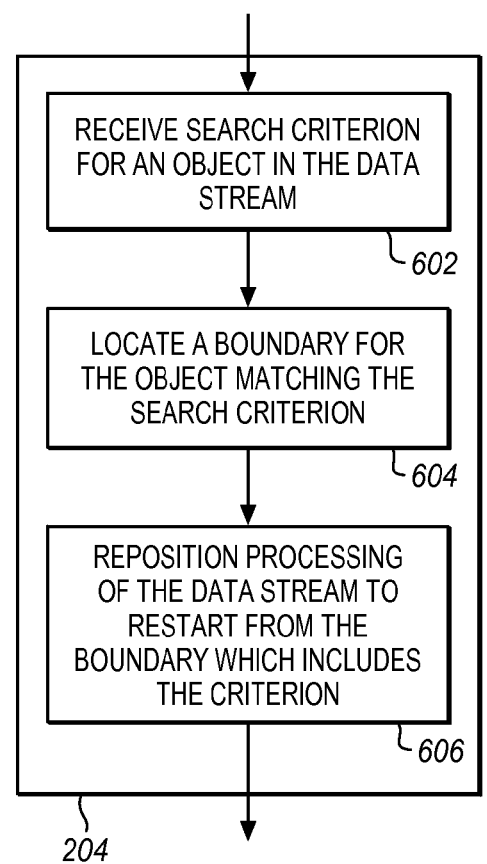

SYSTEMS AND METHODS FOR REPOSITIONING ON USER DEFINED BOUNDARIES IN A PRESENTATION DATA STREAM

BACKGROUND OF THE INVENTION

1. Field of the Invention

The invention is related to the field of processing presentation data, and in particular, to repositioning processing of a presentation data stream starting from user defined boundaries.

2. Statement of the Problem

Presentation data streams are used as input for presentation devices. One application of presentation data streams is printing, and in particular, production printing. For a number of reasons, it may be useful to pause printing of presentation data and to later resume the presentation at a different point in the presentation data. For example, in the context of production printing and mass printing, printing or post-print processing errors are common. During the printing of a print job (e.g., a presentation data stream), one or more printed pages may be damaged or otherwise rendered defective. Post processing equipment attached to a continuous form printer, such as cutters, inserters, sorters or stackers may damage printed pages. The continuous form printer may print one or more pages lighter than desired. As a consequence, operators may need to reprint defective pages that encountered errors somewhere in the workflow. Thus the printing of the presentation may be paused, the problem corrected, and the printing of the presentation data resumes at a specified point such as at the last properly printed sheet. The presentation data stream is said to be "repositioned" at the new resumption point. Repositioning may also be used for alternative presentments, such as e-mail, web-pages, hand-held devices, and other customer communications.

Since many of these errors occur during post processing, the printer is not likely to automatically detect the error and re-print the defective pages (like in a paper jam situation). Thus, the operator may need to reposition processing of the data stream and re-print the defective pages on the printer, ideally without producing the wrong pages and with minimum scrap.

In other scenarios, it may be necessary to reposition processing of the data stream to re-prioritize the printing of documents in the data stream. For example, a higher priority may be assigned to one portion of the presentation data as compared to another portion. A particular group of customer invoices, for example, may be deemed more important to print at this time than another group in the same presentation data file. In such a scenario, the printing of the presentation data may be paused by an operator, the printing system repositioned to a different point in the presentation data stream, and printing resumed at that new point in the presentation data stream.

To reposition within the printer data stream as presently practiced, an operator must reposition to the general point from which to resume (e.g., forward space 1000 pages), and then manually adjust the reposition from that point to start printing from the precise page (e.g., a mail-piece) that the operator desires.

Mass mailing is one particular application where data stream repositioning is particularly useful. In mass mailing, a data stream comprising a plurality of mail-pieces is processed by a printing system. A mail piece may comprise a plurality of documents for a recipient (e.g., a customer), such as a customer invoice, targeted advertising, customer notifications (e.g., privacy policies), etc. All of the documents comprise a mail-piece within the data stream, and once printed, the mail-piece may then be processed by post processing equipment, such as cutters, staplers and inserters to cut and staple the pages and insert the mail-piece documents into envelopes for mailing. One of ordinary skill in the art will recognize the applicability to equivalent problems with doing e-presentment of customer transactional data, in lieu of mass mailings.

In a data stream comprising multiple documents (e.g., customer invoices), the current, largely manual, repositioning process at the page-level may cause partial printing of documents. In other words, an operator may improperly reposition the data stream to resume printing at an incorrect page. This error may result in a partial document or partial mail piece being generated. Worse yet, the erroneous partial document may end up in another customer's envelope when the sheets are processed by inserters and the like. Such an error is not only unprofessional, but opens up the printing operator or business to possible liability for divulging customer confidential information (e.g., personal medical or financial information of a customer). For example, if Joe Smith's invoice is destroyed during the cutting process, the operator may desire to reprint Joe Smith's invoice. The operator may try to reposition the data stream to the first page of Joe Smith's invoice. However, the operator may inadvertently reposition the data stream to the last page of John Doe's invoice, which immediately precedes Joe Smith's invoice in the data stream. Thus, Joe Smith will receive the last page of John Doe's invoice.

It is possible within the art to produce system controls which can detect such a partial mail-piece condition, and disallow the actual mailing of the erroneous mail piece, as well as create a reprint for an individual mail piece. Such systems are most generally referred to as an Automated Document System or Automated Document Factory (ADF), and include IBM's Infoprint® Workflow and Infoprint® Process Director products. However, this invention advances the art over ADF functionality. First, such system controls may be most cost effective only for large mailing environments, and are far from ubiquitous in the mailing and e-presentment industries. By contrast, repositioning of a print job is an inherent print system capability, built into spooling systems as old as JES on z/OS, as currently evidenced by the ability to move forward and back, or print part of a file, on most modern print and presentation systems. Second, because the ADF is built atop the inherent capabilities, while it can detect a bad mail piece, it cannot prevent it. Because the inherent capabilities of the system allow page-level-reprinting to occur via printer or system commands, scrap costs and other operational headaches can still occur even with an ADF due to human error. ADFs can preclude such erroneous mailings from going out the door, but the present invention addresses and improves the inherent repositioning functionality to improve results in both ADF and non-ADF presentation environments.

Unfortunately, present printing systems and management applications do not allow an operator to reposition a data stream at positions other than page-level boundaries. For example, even in highly controlled ADF environments where piece level reprinting is possible, page-level repositioning is still built into printer and spooling system controls, and is in wide use to correct common quality issues such as making adjustments to the "look" of the printing via backing up and trying (n) pages again after making changes to the printer, paper, etc. Thus, an operator choosing an inappropriate restart position after a reposition within the data stream remains a problem. This creates a risk of printing partial-mail pieces and other partial document printing.

SUMMARY OF THE SOLUTION

The invention solves the above and other related problems with systems and methods for repositioning a presentation data stream at user defined boundaries. A user may define customizable boundaries, such as mail-piece boundaries when printing mail, chapter boundaries for printing books, as well as additional boundaries that logically group or divide a data stream. The operator advantageously does not need to guess or go through trial and error processes to determine the reposition point of the data stream. Rather, features and aspects herein allow repositioning to occur on more useful user defined boundaries that result in more accurate and flexible repositioning of a presentation data stream.

One aspect herein is a system for presenting a data stream. The system comprises an interface adapted to receive the data stream comprising user defined boundaries. The system further comprises a controller adapted to reposition presentation of the data stream to a selected user defined boundary. The system further comprises a presentation device for presenting the data stream starting from the selected user defined boundary.

Another aspect herein is a method for processing a data stream. The method comprises receiving a data stream comprising user defined boundaries. The method further comprises repositioning processing of the data stream by a presentation device to a selected user defined boundary. The method further comprises presenting the data stream on the presentation device starting from the selected user defined boundary.

Another aspect herein is a method for generating user defined boundaries in a data stream. The method comprises generating the data stream for presentation on a presentation device. The method further comprises receiving user input defining a user defined boundary in the data stream. The method further comprises inserting information into the data stream identifying the user defined boundary. The method further comprises transmitting the data stream to the presentation device, wherein the user defined boundary is used to reposition processing of the data stream by the presentation device.

The invention may include other exemplary embodiments described below.

DESCRIPTION OF THE DRAWINGS

The same reference number represents the same element on all drawings.

FIG. 5 is a flowchart providing additional exemplary details of a method for processing a data stream in accordance with features and aspects herein to skip over a specified number of objects in the data steam.

FIG. 6 is a flowchart providing additional exemplary details of a method for processing a data stream in accordance with features and aspects herein to search for an object in a data steam and to reposition the data stream to the specified object.

DETAILED DESCRIPTION OF THE INVENTION

FIGS. 1-10 and 12-13 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
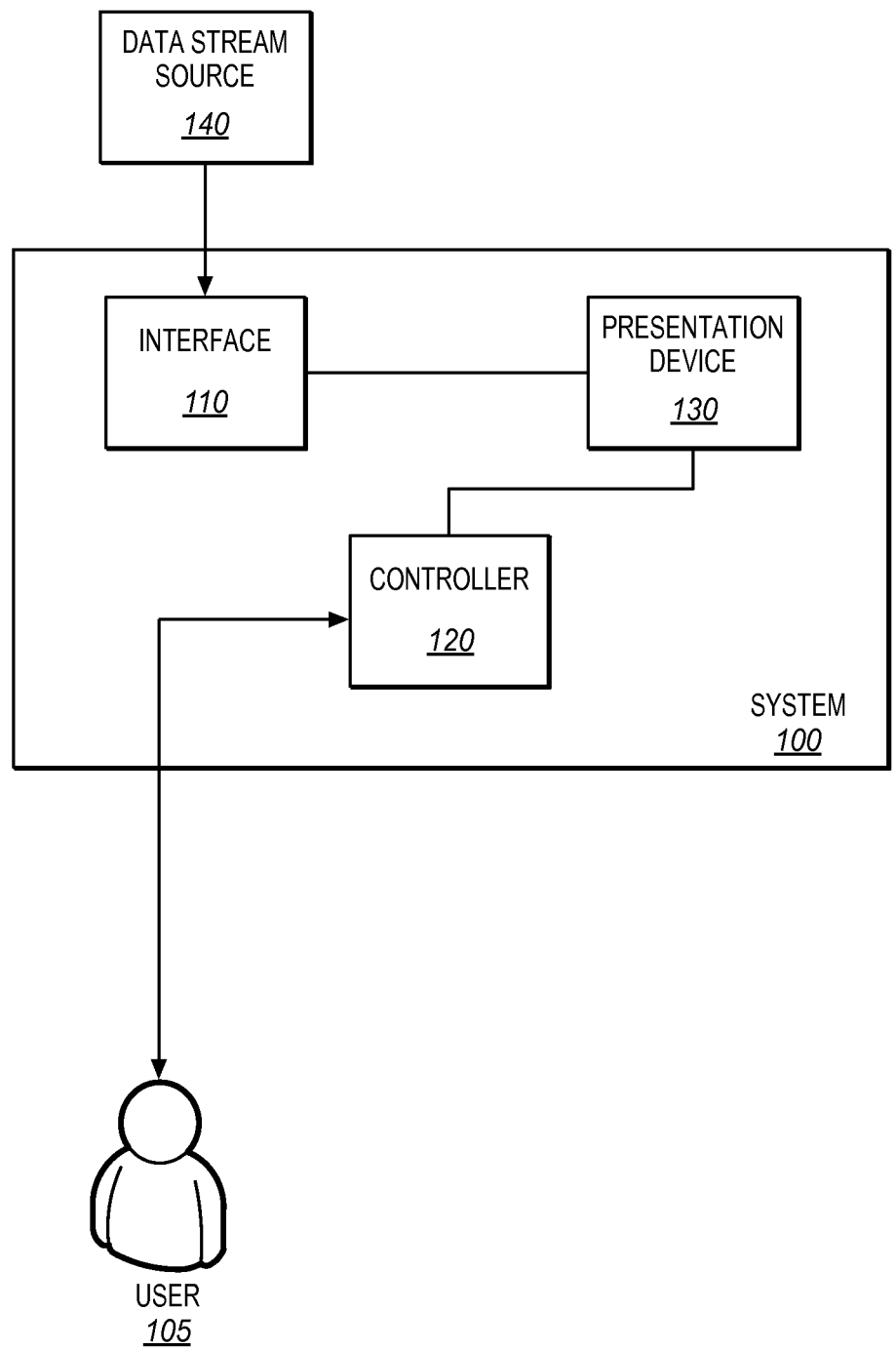
FIG. 1 is a block diagram of an exemplary system for repositioning a data stream in accordance with features and aspects herein.

FIG. 1 is a block diagram of an exemplary system 100 for repositioning a data stream. In general, such a system 100 is an aspect of a presentation system that provides presentation of a data stream on a presentation device 130. Presentation data streams are used for a variety of purposes on different types of presentation devices 130. Exemplary presentation devices include printers, electronic presentment (via e-mail, webpages, viewable on I-Pods, cellphone, PDA, etc.), computer monitors or other display devices. For example, presentation data streams may be displayed on suitable display devices, such as computer monitors. Further, for example, presentation data streams may be printed on a printable medium using a printer or any other suitable device capable of imprinting an image or text on a printable medium.

System 100 includes an interface 110 adapted to receive the data stream from a data stream source 140. The data stream source 140 may be a personal computer, work station, mainframe or other suitable processing device capable of generating a presentation data stream. Interface 110 is any device capable of receiving the presentation data stream from data stream source 140. The presentation data stream may be transferred between data stream source 140 and interface 110 through any suitable wired or wireless connection. Any of a variety of well known commercially available interfaces and associated protocols may be used as a matter of design choice, including for example, Ethernet, Fibre Channel, USB, Firewire or any other wired or wireless media and interfaces. Features and aspects hereof may be applied to legacy JES spool environments, using either TCP/IP or CHNL attachments to drive data to a high speed printer more efficiently.

Interface 110 is coupled to presentation device 130, and provides the presentation data stream to presentation device 130 for presentation. The system additionally comprises a controller 120 coupled to presentation device 130 and adapted to reposition presentation of the data stream by presentation device 130 to a selected user defined boundary. Controller 120 may comprise a graphical user interface (GUI), as well as input devices for allowing user 105 to reposition presentation and processing of the data stream by presentation device 130 to user defined boundaries in the presentation data stream. Exemplary input devices include keyboards, mice, pen and other pointer devices, touch screens, voice input, etc. Such input devices and associated processing techniques are well known to those of ordinary skill in the art and omitted herein simply for brevity of this discussion.

In one embodiment, presentation device 130 may be a printer, such as a high speed continuous form printer used for production printing. Interface 110 and controller 120 may be for example components of the printer. For example, controller 120 may be a printer controller of the printer or printing system combining the printer with an ADF or other workstation controller. Further, interface 110 may be an interface onboard the printer for interfacing with print servers, personal computers, workstations and other data stream sources 140. The presentation data stream may include a data stream of print jobs, such as invoices, books, mail-pieces, etc. to be printed by the printer. The presentation data stream may also include a data stream of text, images, slides and other visual information displayed on a screen, computer monitor or other suitable display device. Such data streams may include user defined boundaries, in accordance with features and aspects herein, used by controller 120 for repositioning processing of the data stream by presentation device 130. Presentation device 130 may comprise a graphical user interface (GUI), as well as input devices for allowing user 105 to reposition presentation and processing of the data stream by presentation device 130 to user defined boundaries in the data stream. Interface 110 may also allow reposition of the data stream by the same or a different user (e.g., via use of the JES backspace command).

In another embodiment, system 100 may comprise a print server or printer server, e.g., a Print Services Facility™ (PSF). Interface 110 and/or controller 120 may be embedded in the print server (e.g., a PSF), and adapted to communicate with a printer, such as presentation device 130. The print server receives the presentation data stream from data stream source 140. The print server may further reposition processing or presentation of the data stream by the presentation device 130 through transmission of appropriate commands to presentation device 130. A print server may comprise a graphical user interface (GUI), as well as input devices for allowing user 105 to reposition presentation and processing of the data stream by presentation device 130 to user defined boundaries in the data stream.

Figure 13:
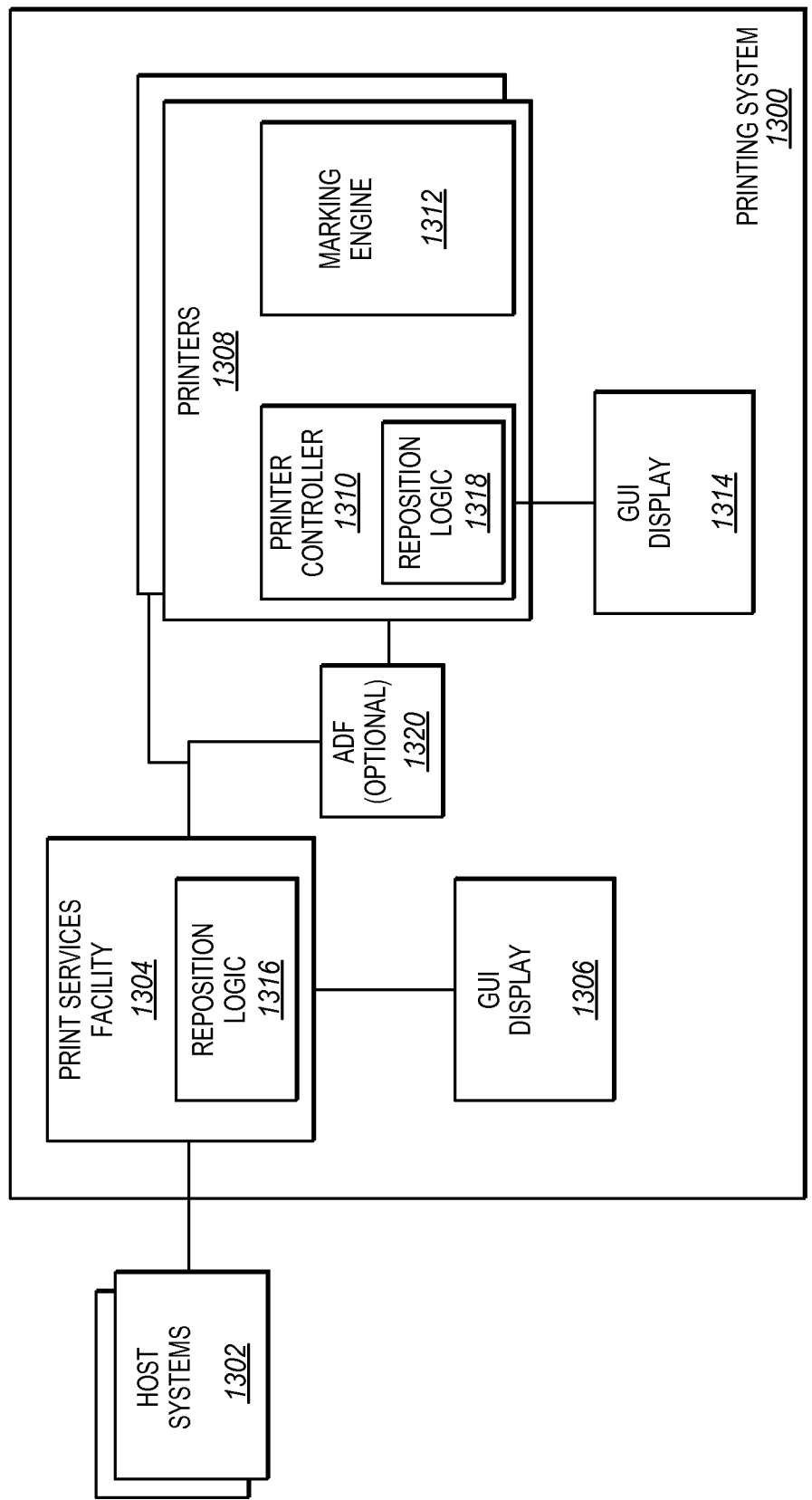
FIG. 13 is a block diagram of an exemplary printing system enhanced in accordance with features and aspects herein.

FIG. 13 illustrates an exemplary printing system 1300 coupled to one or more host systems 1302 for receiving a data stream (e.g., raw print jobs) therefrom and for imprinting the raw print jobs on appropriate printable medium. It is common that the printable medium is paper, but the scope of the invention includes e-presentment as well as presentation upon a physical medium. The printing system may utilize pre-cut sheets of paper or may use paper in the form of a continuous feed (e.g., fanfold or rolls of paper). Those of ordinary skill in the art will recognize that other equivalent printable media, as well as e-presentment of information in lieu of printing, may be used in appropriate printing systems. As used herein, "paper" may be understood to include any printable medium used in a printing system. Therefore features and aspects as recited herein are intended to broadly cover any printing system that may use paper or other printable media.

Printing system 1300 may generally include PSF 1304 for controlling overall operation of the printing system 1300. PSF 1304 is generally responsible for interfacing with the host systems 1302 to receive data streams. Host systems 1302 are coupled to PSF 1304 through any of several well-known protocols and associated communication media including, for example, IBM channel connections, other high speed parallel bus structures, high speed serial communications, etc. PSF 1304 may further comprise reposition logic 1316 implementing features and aspects herein for repositioning processing of a data stream by printer 1308 at user defined boundaries. Repositioning logic 1316 may use as input boundary criteria, as well as page or object controls to reposition within the data stream. PSF 1304 may further comprise a GUI display 1306 allowing a user to reposition processing of the data stream by printer 1308 at user defined boundaries.

Printing system 1300 further comprises one or more printers 1308. Printer 1308 generally comprises a printer controller 1310 for controlling the operation of printer 1308. Printer controller 1310 may further comprise reposition logic 1318 implementing features and aspects herein for repositioning processing of a data stream by printer 1308 at user defined boundaries. Those of ordinary skill in the art will recognize that the repositioning logic of printing system 1300 may occur within the print server (e.g., PSF 1304) and/or within the printer (e.g., printer 1308). Printer 1308 further comprises marking engine 1312. Marking engine 1312 affixes pixels of the formatted pages onto the printable medium to generate the final printed sheets. Marking engine 1312 (also commonly referred to as a printing engine or imaging engine) may affix or mark pixels on paper using liquid or dry toning/inking materials applied via mechanical, electrostatic, and/or electrophotographic means. Printer 1308 may further comprise a GUI display 1314 allowing a user to reposition processing of the data stream by printer 1308 at user defined boundaries. Those of ordinary skill in the art will also recognize that GUI and other presentation can be via web page or other virtualized medium not locally attached to the system. Printing services facility 1304 and printer 1308 may be optionally coupled via ADF 1320.

Those of ordinary skill in the art will readily recognize that the functional elements depicted within system 100 of FIG. 1 and system 1300 of FIG. 13 are intended merely as exemplary of functional elements within a printer controller or print server enhanced in accordance with features and aspects herein. Numerous other elements (not shown) may be useful in implementing these and other features of such an enhanced printing system. Further, the depicted functional elements may be integrated or separated in a manner different than that shown in FIGS. 1 and 13. Such design choices are readily apparent to those of ordinary skill in the art.

Figure 11:
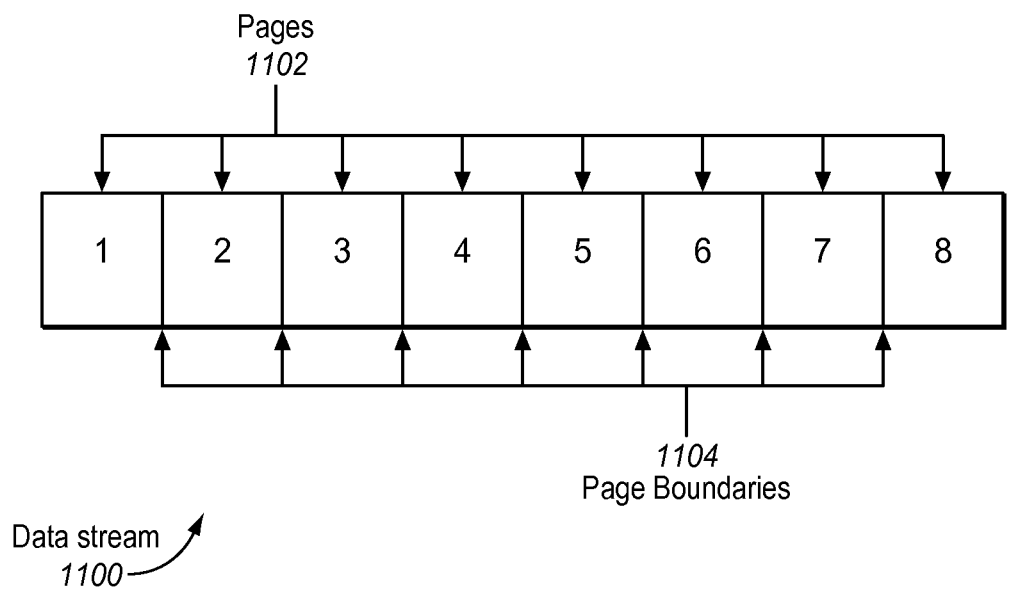
FIG. 11 is a block diagram of a prior art presentation data stream having a plurality of pages and accompanying page boundaries.

As presently practiced, presentation data streams often comprise page boundaries between pages of the data stream. FIG. 11 is a block diagram of a presentation data stream 1100 as presently known in the art comprising a plurality of pages 1102 and accompanying page boundaries 1104 between pages 1102. Thus, an operator (e.g., user 105 of FIG. 1) may reposition presentation or processing of the data stream by a presentation device to a selected page 1102 by specifying the page at which to reposition the data stream. However, as presently practiced in the art, if pages are logically grouped together (e.g., customer invoices), then the operator cannot easily reposition the data stream from the start of a specific customer invoice. Rather, an error prone manual process is typically used to try to identify an appropriate point to restart processing. For example, if pages 3-5 comprise the invoice of John Smith, then the operator can reposition the data stream from the start of John Smith's invoice if the operator knows that the invoice starts on page 3 of the data stream. Otherwise, the operator needs to guess a page at which to reposition the data stream, and then page forward or backward until the desired position of the data stream is found. For example, the operator may guess that page 5 is the start of John Smith's invoice, and reposition the data stream at page 5. Once the data stream has been repositioned, the operator may realize that page 5 is actually the end of John Smith's invoice, and may page backward in the data stream (e.g., move one page at a time) until the operator reaches the start of the invoice on page 3 of the data stream. Features and aspects herein permit user defined boundaries within the data stream to be used by the operator to reposition the data stream at logical boundaries, such as the start of a customer's invoice.

Figure 12:
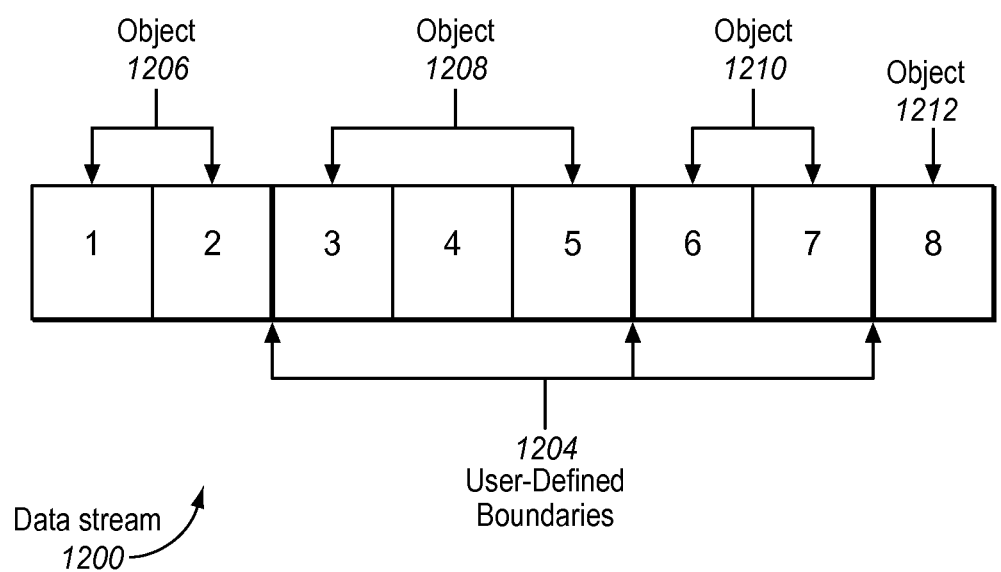
FIG. 12 is a block diagram of an exemplary presentation data stream modified in accordance with features and aspects herein to comprise a plurality of objects and user defined boundaries.

FIG. 12 is a block diagram of an exemplary presentation data stream modified in accordance with features and aspects herein to comprise a plurality of objects and user defined boundaries. Assume that data stream 1200 comprises a plurality of mail pieces (e.g., customer invoices), represented by object 1206, object 1208, object 1210 and object 1212. Typically, customer invoices may comprise varying number of pages, depending on the contents of the customer's invoice. Like prior art data stream 1100, data stream 1200 comprises individual pages and page boundaries. However, data stream 1200 additionally comprises a plurality of user defined boundaries 1204 separating objects 1206-1212 at the end of each object (e.g., customer invoice). Thus, if a printer prints objects 1206-1212, and an operator later discovers a problem with the printed result of object 1210 (e.g., a post processing cutting machine mis-cuts the customer invoice), then the operator in accordance with features and aspects herein may reposition the data stream and re-print starting at object 1210. Rather than guessing the beginning page position of object 1210 using a trial and error process to find the precise beginning page position, the operator may specify the starting range of reprinting as the beginning user defined boundary 1204 of object 1210. An operator may also define the ending range of the reprinting as the ending user defined boundary 1204 of object 1210. Not only does this eliminate the trial and error process for determining the reprinting page range, but the risk of inadvertently printing part of another customer's invoice during the re-print is also eliminated. Thus, searching for a particular piece, or location of an appropriate boundary based on a page offset, are both supported.

Figure 2:
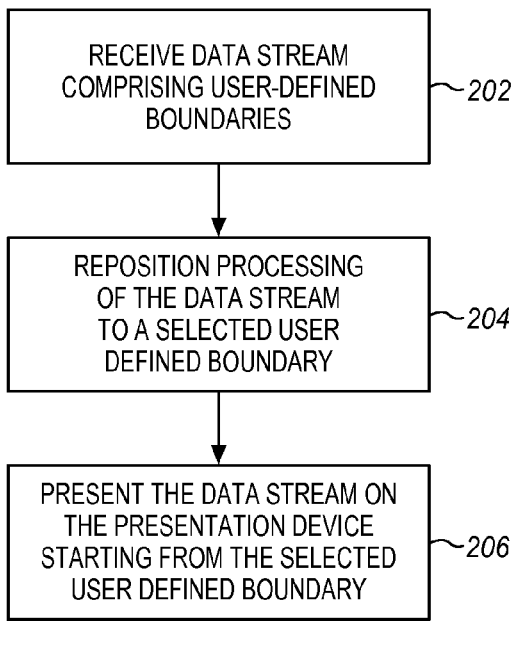
FIG. 2 is a flowchart of an exemplary method for processing a data stream in accordance with features and aspects herein.

FIG. 2 is a flowchart describing an exemplary method for processing a data stream in accordance with features and aspects herein. The method illustrated in FIG. 2 permits user defined boundaries within the data stream to be used to reposition the data stream at logical boundaries, such as the start of a customer's invoice, rather than just repositioning the data stream at page boundaries. A user may define multiple types of boundaries within the data stream, allowing the user to reposition processing or presentation of the data stream on selected criteria that can vary on a job-by-job or printer-by-printer basis. Exemplary boundary conditions defined to provide more flexible, useful repositioning include account numbers, document numbers, individual mail pieces (such as for invoices, bank statements, or any other customer reporting), chapters or a book, sections of a large print job, or any named grouping of pages. In addition, individual mail pieces are often grouped within a print job in ways that provide other useful boundaries, such as by zip code, individual trays and pallets or by mail piece weight.

Element 202 of FIG. 2 is operable to receive the data stream comprising user defined boundaries. The user defined boundaries may be inserted into the data stream by an application generating the data stream, or may be inserted into the data stream by a suitable post processing application. For example, a print server may insert user defined boundaries during post processing of the data stream prior to transmitting the data stream to a printer or presentation device.

Element 204 is operable to reposition processing or presentation of the data stream by a presentation device to a selected user defined boundary. A GUI or other appropriate user interface may be used to allow a user to reposition processing of the data stream to the selected user defined boundary by specifying a boundary or position within the data stream.

Element 206 is operable to present the data stream on the presentation device starting from the selected user defined boundary.

One exemplary presentation of a data stream includes using a printer to print the data stream on a printable medium. Presentation may also include displaying the data stream on a computer monitor or other appropriate display device. A speaker giving a presentation may define within a data stream comprising a slide show user defined boundaries marking the beginning of chapters within the slide show. Thus, if an audience member asks the speaker to return to a previous chapter, the speaker may use the user defined chapter boundaries to return to the chapter rather than paging through each slide to find the appropriate starting location of the desired chapter.

While the above described method eliminates the need for page-level repositioning (e.g., reprint pages 6-7), the method illustrated in FIG. 2 can be further enhanced to provide error checking and correction for users attempting to reposition using a page level repositioning command. For example, it may be desirable to reposition the data stream to the nearest user defined boundary relative to a user specified page number (i.e., either restarting at the previous user defined boundary or the next forward user defined boundary). This allows for uniform restart results whether initiated from software or the printer-console to eliminate operator mistakes from the production floor. Operator mistakes may occur when an operator attempts to reposition due to an error, or may also occur when an operator repositions for other reasons, such as reprioritizing printing of a data stream.

Figure 3:
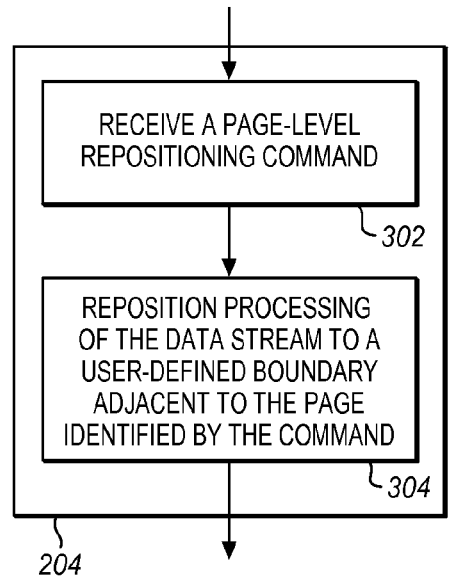
FIG. 3 is a flowchart providing additional exemplary details of a method for processing a data stream in accordance with features and aspects herein to reposition processing of a data stream to an appropriate resumption point in response to a page-level repositioning command.

FIG. 3 is a flowchart providing additional exemplary details of the repositioning process of element 204 of FIG. 2. As noted above, element 204 of FIG. 2 is generally operable to reposition processing of the data stream to a selected user defined boundary.

Element 302 of FIG. 3 is operable to receive a page-level repositioning command. The page-level repositioning command identifies a page at which to reposition the data stream.

Element 304 is operable to reposition processing of the data stream by the presentation device to a user defined boundary adjacent to the page identified by the page-level repositioning command (i.e., nearest adjacent boundary forward or backward). This may include repositioning processing of the data stream by the presentation device backward or forward to a user defined boundary adjacent to the page identified. If the page-level repositioning command identifies a boundary, then the requested page needs no adjustment. Element 304 may also operate to move either forward or backward to find the boundary which is closest in proximity to the specified page. Backward or forward repositioning may be specified by a user, or may be persistently configured on the presentation device. For example, if the page-level repositioning command identifies page 4 of a data stream, then element 304 may reposition processing of the data stream from a user defined boundary preceding page 3(e.g., reposition to the beginning of the invoice comprising page 4). Likewise, element 304 may reposition processing of the data stream from the user defined boundary preceding page 6(e.g., reposition to the beginning of the next invoice). In a printing environment, this eliminates an operator specifying a page to begin reprinting that falls in the middle of a mail-piece, book, chapter or other document, and repositions printing to an appropriate resumption point (e.g., the beginning of a new document). One of ordinary skill in the art may recognize that situations may occur where it may be beneficial to reposition to a boundary that is not immediately adjacent to the specified page. Alternatively, element 304 may operate to reposition to a non-adjacent boundary (e.g., a boundary that is two or more boundaries away from the present page).

The definition of user defined boundaries may be integrated with existing structures of documents or data streams constructed in accordance with standardized document structures. Existing document structure architectures, such as the Mixed Object Document Content Architecture ("MO:DCA") presently define existing boundaries within a data stream. The MO:DCA architecture uses indexing and attribute tagging structured fields added to documents to permit selected retrieval of specific pages and page groups for later viewing or printing. Six structured fields are defined for this purpose, including: begin document index, index element, tag logical element, end document index, begin named group (BNG) and end named group (ENG).

An index is bracketed by Begin Document Index and End Document Index structured fields. The index may contain Index Element (IEL) structured fields used to locate objects in a document, and Tag Logical Element (TEL) structured fields used to tag pages and page groups with attribute names and their values. Pages in a document may be grouped for indexing using the BNG and ENG structured fields. In advanced function presentation (AFP) environments, the document index may be located external to the document, e.g. in an external database in ADF environments.

Present print servers typically ignore these structured fields when printing documents and data streams comprised of AFP files. For example, IBM Print Services Facility™ systems do not use document indexes. Thus, the BNG and ENG structured fields are not translated to corresponding page description languages for a printer or other presentation device, such as Intelligent Printer Data Stream™ (IPDS™). Features and aspects herein allow enhancement of printers, print servers and other presentation devices to use BNG and ENG structured fields for repositioning processing of the data stream by the presentation device to logical boundaries within the data stream.

By defining BNG structured fields or other types of user defined boundaries within the data stream, the data stream may be delineated into a plurality of objects. As used herein, an object is a logical grouping of one or more pages, such as a document comprising a plurality of pages. Exemplary objects include mail-pieces, customer invoices, books, chapters and other logical groupings of pages and documents. Printers, print servers and presentation devices enhanced according to features and aspects herein permit a user to specify a number of objects to skip in the data stream in lieu of specifying pages. Rather than skipping over a number of specified pages (e.g., pages 500-1000) in the data stream, the user can specify a number of objects to skip in the data stream.

A presentation device or print server enhanced according to features and aspects herein permits translation of the BNG and ENG structured fields into corresponding user defined boundaries within the data stream processed by the presentation device. For example, a print server may translate the AFP file into a corresponding page description language (e.g., IPDS) transmitted to the printer. When the data stream is transmitted to the printer by the print server, the data stream may comprise user defined boundary structured fields or corresponding page description language objects representing the user defined boundaries. Thus, the print server and/or printer may use the user defined boundaries to reposition processing of the data stream by the presentation device (e.g., printer).

Figure 4:
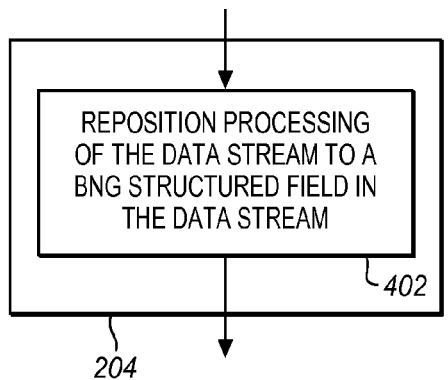
FIG. 4 is a flowchart providing additional exemplary details of a method for processing a data stream in accordance with features and aspects herein to reposition processing of a data stream to an Advanced Function Presentation (AFP) begin named group (BNG) structured field in the data stream.

FIG. 4 is a flowchart providing additional exemplary details of the repositioning process of element 204 of FIG. 2 as applied to MO:DCA structured data streams. As noted above, element 204 of FIG. 2 is generally operable to reposition processing of the data stream to a selected user defined boundary. Element 402 of FIG. 4 is operable to reposition processing of the data stream to a BNG structured field in the data stream. The presentation device and/or print server parses the data stream to determine the positions of the BNG structured fields in the data stream. When repositioning processing of a data stream is requested, the presentation device and/or printer server uses the BNG fields to reposition processing of the data stream from the selected position. One of ordinary skill in the art will recognize other equivalent structures in other types of data streams, as well as other alternatives which are possible within AFP.

A user may also specify that the repositioning process is to occur based on a specified or number of objects in the data stream rather than based on page level repositioning (e.g., through a toggle button on a GUI). FIG. 5 is a flowchart providing additional exemplary details of the repositioning process of element 204 of FIG. 2 responsive to an operator request to skip a specified number of objects defined by user defined boundaries in the data stream. As noted above, element 204 of FIG. 2 is generally operable to reposition processing of the data stream by a presentation device to a selected user defined boundary in the data stream.

Element 502 of FIG. 5 is operable to receive user input specifying a number of objects to skip in the data stream. The number of objects specified defines a resumption point of processing of the data stream by the presentation device. For example, objects in the data stream may comprise mail-pieces delineated by user defined boundaries. User input may then specify that the presentation device is to skip over a number of objects in the data stream.

Element 504 is operable to skip over the number of objects specified by the user input and reposition processing of the data stream at the resumption point. For example, the user input may specify that the presentation device should skip forward over 50 objects in the data stream. The resumption point is then defined as 50 object boundaries ahead of the current position of processing of the data stream, and processing may resume at the resumption point. One of ordinary skill in the art will recognize that appropriate error handling is included in the scope of the invention, and may be required to handle various situations within an embodiment (e.g., a request to move forward more objects or pages than is possible).

Likewise, the user input may define a number of objects to skip backward in the data stream. For example, a post processing cutting process may destroy a plurality of mail-pieces. Thus, an operator may decide to skip backward 50 mail pieces in the data stream and re-print the mail-pieces destroyed by the cutting process.

In another embodiment, the data stream may comprise a plurality of objects, with each type of object delineated by a corresponding user defined boundary. For example, if the data stream comprises mail-pieces, then objects in the data stream may include states, zip codes and individual mail pieces. At the highest level, mail-pieces may be grouped by a state of destination. At a lower level, mail-pieces may be grouped by zip code of destination. At a lower level, mail-pieces may be grouped by the corresponding pages of the mail-pieces. With the corresponding user defined boundaries, a user may skip forward or backward in the data stream to a specified state, or a zip code.

Using user defined boundaries, information (e.g., metadata) relating to an object may be stored with the user defined boundary and used to search and reposition processing of the data stream at an object defined by a search criterion. FIG. 6 is a flowchart providing additional exemplary details of the repositioning process of element 204 of FIG. 2 responsive to reposition based on operator supplied search criteria. As noted above, element 204 of FIG. 2 is generally operable to reposition processing of the data stream by a presentation device to a selected user defined boundary.

Element 602 of FIG. 6 is operable to receive user input defining a search criterion for an object in the data stream. For example, if the data stream comprises a plurality of mail-pieces, each user defined boundary may store a customer number or invoice number for the mail-piece. If the data stream needs to be repositioned starting at a particular customer invoice, then the search criterion may specify the customer invoice number.

Element 604 is operable to locate a boundary for the object matching the search criterion. In general, element 604 searches the metadata stored with the user defined boundaries to locate the boundary with metadata matching the received search criteria. Such search processing techniques are well known to those of ordinary skill in the art and omitted herein simply for brevity of this discussion.

Element 606 is operable to reposition processing of the data stream by the presentation device from the boundary for the object. Thus, if the presentation device is a printer, then printing may continue starting at a user defined boundary for a mail-piece specified by the search criterion. An operator does not need to know a page or even a general position forward or backward of the object in the data stream to reposition the data stream from the user defined boundary for the object.

Features and aspects herein have been described as repositioning processing of a data stream at user defined boundaries rather than page-level repositioning employed by present presentation systems. However, presentation systems enhanced with features and aspects herein may permit continued use of page-level repositioning, and may be further enhanced to determine whether a specified page identified by a page-level repositioning command is an appropriate resumption point. Different types of hierarchical groupings of pages may provide that some, but not all of the pages would be an appropriate restart point after a reposition within the data stream, and may need to vary by job type. If the page identified by a page-level repositioning command is not an appropriate resumption point, then processing of the data stream may be automatically repositioned to restart from an appropriate resumption point in the data stream.

Figure 7:
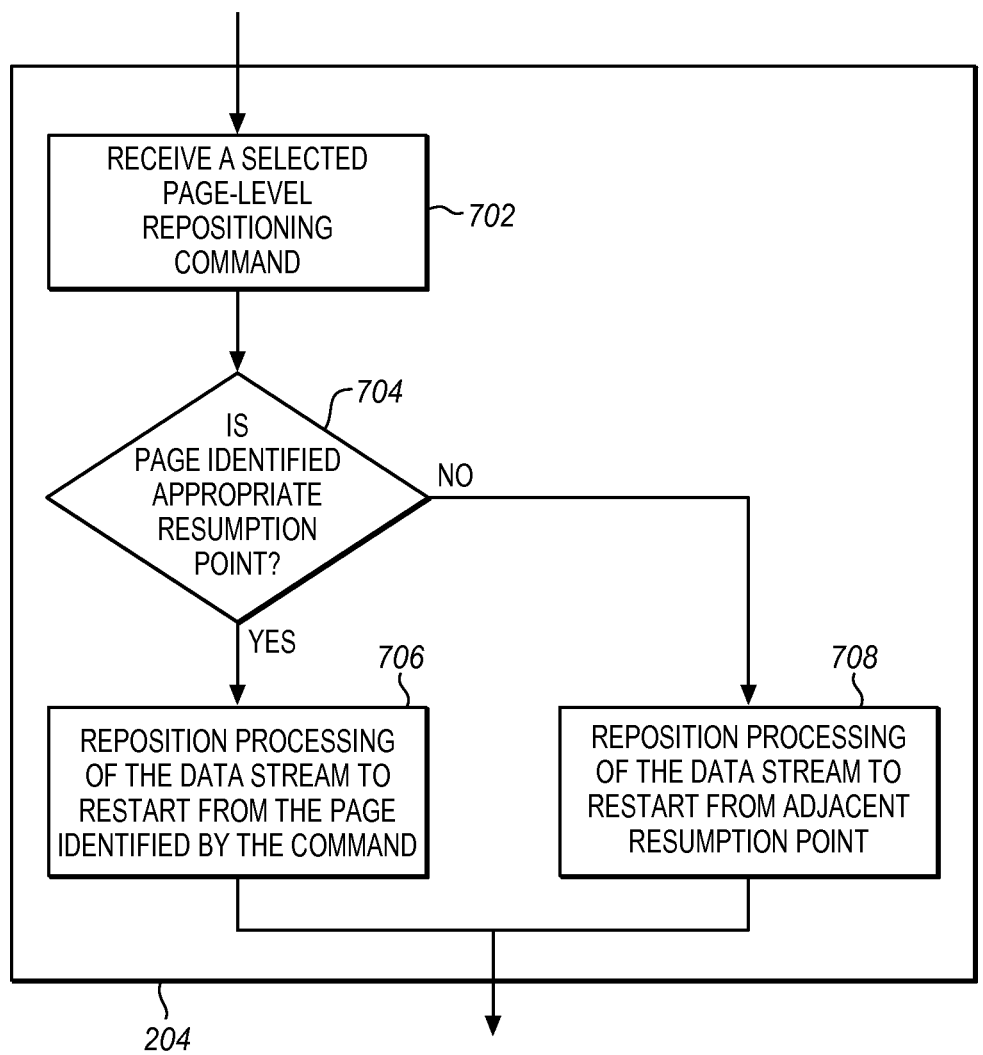
FIG. 7 is a flowchart providing additional exemplary details of a method for processing a data stream in accordance with features and aspects herein to reposition processing of the data stream to an appropriate resumption point in response to a page-level repositioning command.

FIG. 7 is a flowchart providing additional exemplary details of the repositioning process of element 204 of FIG. 2 including validation that a specified repositioning point is appropriate. As noted above, element 204 of FIG. 2 is generally operable to reposition processing of the data stream by a presentation device from a selected user defined boundary.

Element 702 of FIG. 7 is operable to receive a selected page-level repositioning command. The page-level repositioning command identifies a page in the data stream from which to reposition processing.

Element 704 is operable to determine whether the identified page is an appropriate resumption point for processing of the data stream. Element 704 makes the determination by comparing the identified page to adjacent user defined boundaries in the data stream. For example, design criteria may define that it is undesirable to resume processing of a data stream at a page that is not preceded by a user defined boundary (e.g., the beginning page of an object). Thus, printing or presentation of the data stream may not resume in the middle of a document or object. For example, if a page-level repositioning command specifies page 4 of a data stream, then the identified page would not be an appropriate resumption point, as page 4 is not preceded by a user defined boundary (e.g., not the beginning page of an object).

If the page identified by the page-level repositioning command is determined to be an appropriate resumption point, then element 706 is operable to reposition processing of the data stream at the page identified by the page-level repositioning command.

If the page identified by the page-level repositioning command is determined to be an inappropriate resumption point (e.g., a page in the middle of an object), then element 708 is operable to reposition processing of the data stream to the adjacent resumption point in the data stream (e.g., the beginning of the next object in the data stream), where the adjacent resumption point is determined by selecting an adjacent user defined boundary in the data stream. One of ordinary skill in the art will recognize that this can also be extended to non-adjacent user-defined boundaries if necessary or desired, to account for (n)-up printing on the physical medium, or other rationale which requires backing up (or moving forward) more than one boundary.

For example, if the page-level repositioning command specifies page 4 of a data stream, then the adjacent resumption point may be the user defined boundary preceding page 3 (e.g., the beginning page of the object). Likewise, the adjacent resumption point may be the user defined boundary preceding page 6 (e.g., the beginning page of the next object). Thus, if design criteria dictate that processing or presentation of the data stream should not resume in the middle of an object, then features and aspects herein ensure that the resumption point of processing of the data stream occurs at a user defined boundary at the beginning of an object.

Design criteria may dictate that the adjacent resumption point is at the beginning of the object comprising the page identified by the page-level repositioning command. Likewise, design criteria may dictate that the adjacent resumption point is at the beginning of the next object following the page identified by the page-level repositioning command. Therefore, if the page identified by the page-level repositioning command is page 4 of a data stream, then the appropriate resumption point may be the beginning of an object comprising the identified page, or the appropriate resumption point may be the next object in the data stream.

Figure 8:
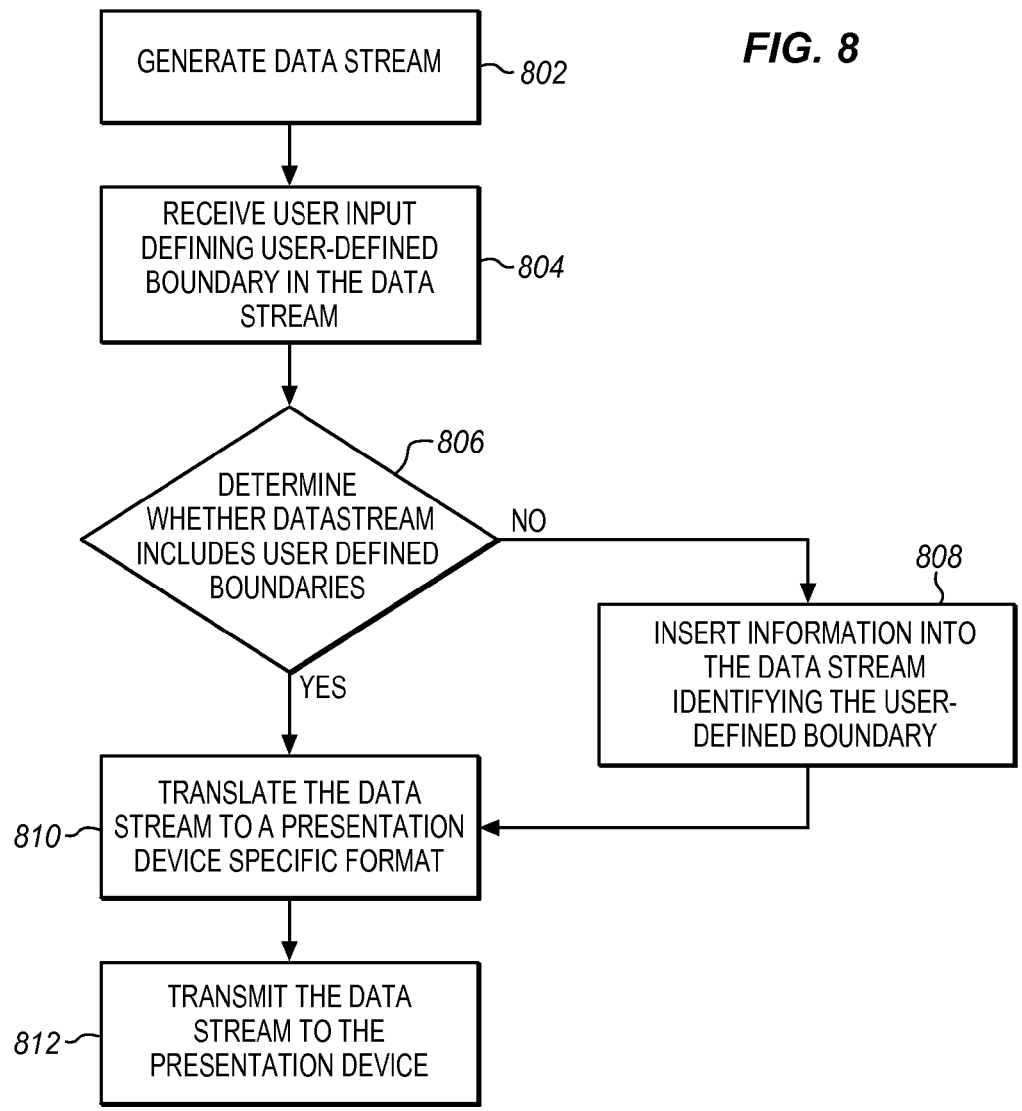
FIG. 8 is a flowchart of an exemplary method for generating user defined boundaries in a data stream.

In order for a presentation system to make use of user defined boundaries for repositioning processing or presentation of the data stream by a presentation device, such user defined boundaries need to be generated for the data stream. FIG. 8 is a flowchart of an exemplary method for generating user defined boundaries in a data stream. User defined boundaries may be generated by an application producing the data stream, or may be generated by a post processing application or system. For example, a print server may be enhanced to generate and insert user defined boundaries into the data stream.

Element 802 of FIG. 8 is operable to generate a data stream for presentation on a presentation device. For example, a software application on a workstation, personal computer or other suitable processing device may generate a data stream for printing or display on a presentation device.

Element 804 is operable to receive user-input defining at least one user defined boundary in the data stream. For example, if the data stream comprises a book, user defined boundaries may include chapters of the book.

Element 806 is operable to determine whether the user defined boundaries already exist in the data stream. If the user defined boundaries already exist, then processing continues in element 810. If the user defined boundaries do not already exist, then processing proceeds to element 808 for insertion of the user defined boundaries.

Element 808 is operable to insert information into the data stream identifying the user defined boundary. The user defined boundary is used to reposition processing of the data stream by the presentation device. Information inserted into the data stream may be for example a structured field that identifies the type of boundary (e.g., mail-piece boundary), as well as identifying information for the object (e.g., invoice number) used for searching the data stream for repositioning processing of the data stream from a specified object. If a user desires to define a plurality of user defined boundaries (e.g., mail-piece, zip code, state), then multiple user defined boundaries may be inserted into the data stream.

Element 810 is operable to translate the data stream into a presentation device specific format (e.g., IPDS).

Element 812 is operable to transmit the data stream to the presentation device. The user defined boundary may then be used to reposition processing or presentation of the data stream by the presentation device. Exemplary uses of the user defined boundaries for repositioning processing of a data stream are described above in regard to FIG. 2.

As described above, one such user defined boundary may be an AFP BNG structured field, thus enabling printer logic 1318 of FIG. 13. Present printing systems typically ignore BNG structured fields when translating a data stream or document to a printable format, such as a page description language. By enhancing a printing system according to features and aspects herein, BNG structured fields in AFP files may be translated into page description languages and used by printers and print servers for repositioning processing (e.g., printing) of a data stream by a presentation device (e.g., a printer) to a specified object delineated by a BNG structured field.

The data stream may comprise one or more AFP BNG structured fields. The BNG structured fields for example may be inserted into a data stream by a software application generating the data stream in element 802. The BNG structured fields may then be translated into appropriate metadata of a page description language.

Figure 9:
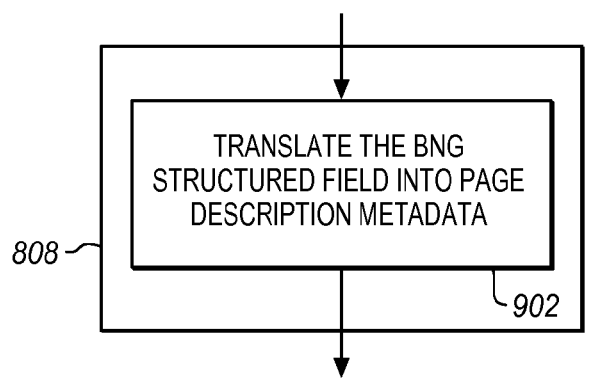
FIG. 9 is a flowchart providing additional exemplary details of a method for generating user defined boundaries in a data stream in accordance with features and aspects herein to insert a begin named group (BNG) structured field in the data stream.

FIG. 9 is a flowchart providing additional exemplary details of the inserting process of element 808 of FIG. 8 to include translation of the BNG fields into corresponding metadata in the printer data stream. As noted above, element 810 of FIG. 8 is generally operable to translate the data stream into a presentation device specific format.

Element 902 is operable to translate the BNG structured field into page description language metadata identifying the user defined boundary. For example, the BNG structured field may be translated by a print server into IPDS metadata that defines the user defined boundary in the data stream. The user defined boundary may then be used by a printer or print server to reposition printing of the data stream by the printer.

Figure 10:
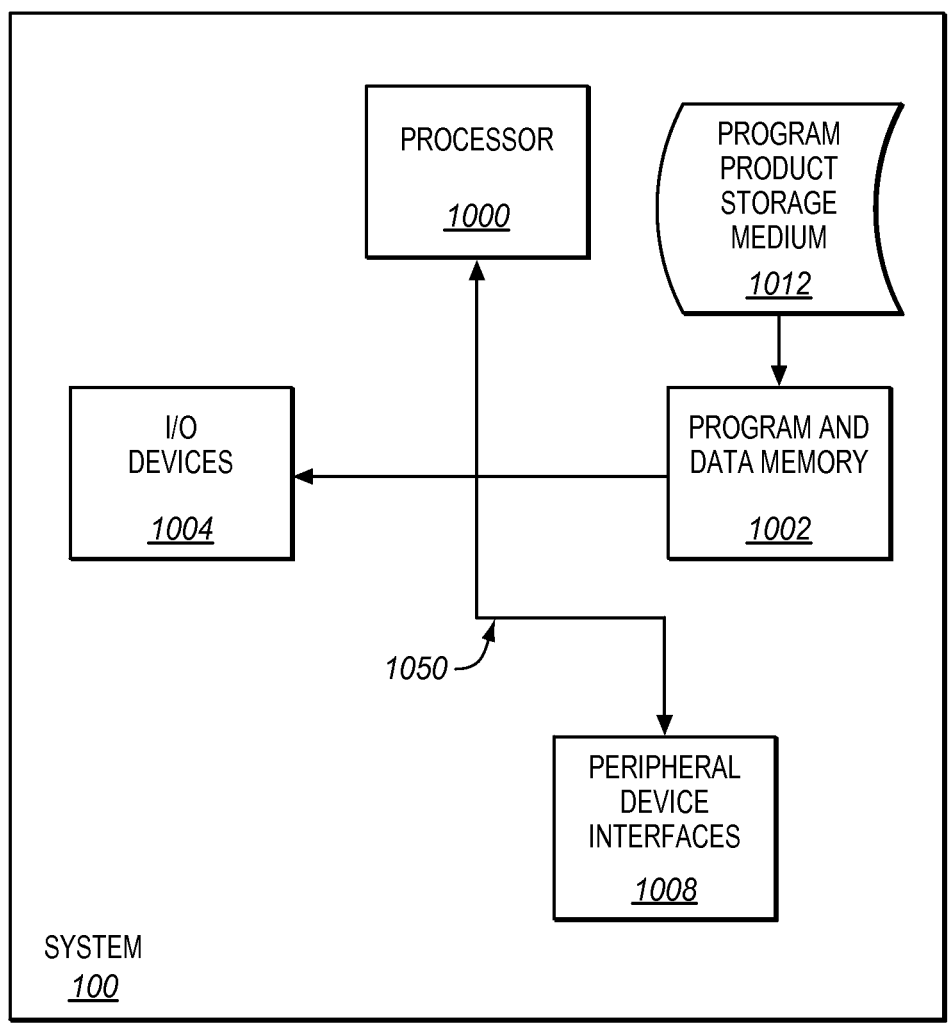
FIG. 10 is a block diagram of an exemplary data processing system that may provide data stream repositioning features and aspects herein including bulk storage of a program product that may embody methods and processes herein.

FIG. 10 is a block diagram of an exemplary data processing system that may provide data stream repositioning features and aspects herein including bulk storage of a program product that may embody methods and processes herein.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 10 is a block diagram of an exemplary data processing system 100 adapted to provide data stream repositioning features and aspects herein by executing programmed instructions and accessing data stored on a computer readable storage medium 1012.

Furthermore, the invention can take the form of a computer program product accessible from a computer-usable or computer-readable medium 1012 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1000 coupled directly or indirectly to memory elements 1002 through a system bus 1050. The memory elements can include local memory employed during actual execution of the program code, bulk storage, and cache memories which provide temporary storage of at least some program code in order to reduce the number of times code must be retrieved from bulk storage during execution.

Input/output or I/O devices 1004 (including but not limited to keyboards, displays, pointing devices, etc.) can be coupled to the system either directly or through intervening I/O controllers. Network adapters or other peripheral interfaces 1008 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

The systems and methods described herein have been characterized in terms of printing applications. However, those of ordinary skill in the art will recognize that the systems and methods described herein may be applicable to any type of presentation device using a presentation data stream.

Although specific embodiments were described herein, the scope of the invention is not limited to those specific embodiments. The scope of the invention is defined by the following claims and any equivalents therein.

We claim:

1. A method for processing a data stream, the method comprising:
   receiving a data stream comprising user-created boundaries that are each defined in an Advance Function Presentation (AFP) Begin Named Group (BNG) structured field, wherein each boundary is a non-printing portion of the data stream that does not alter presentation data for the data stream;
   receiving input that selects one of the user-created boundaries in the data stream; repositioning the data stream for a presentation device to start processing from the selected user-created boundary; and
   presenting the data stream on the presentation device starting from the selected user-created boundary, wherein the repositioning step further comprises:
   receiving a page-level repositioning command, wherein the page-level repositioning command identifies a page at which to reposition the data stream; and repositioning the data stream for the presentation device starting from a user created boundary adjacent to the page identified by the page-level repositioning command.

2. The method of claim 1 wherein the presentation device comprises a printer and the presenting step further comprises:
   printing the data stream on a printable medium starting from the selected user-created boundary.

3. The method of claim 1 wherein the presentation device comprises a printer and the repositioning step further comprises:
   repositioning the data stream through operation of the printer.

4. The method of claim 1 wherein the presentation device comprises a printer and the repositioning step further comprises:
   repositioning the data stream through operation of a print server coupled to the printer.

5. The method of claim 1 wherein the data stream comprises a plurality of objects and the repositioning step further comprises:
   receiving user input specifying a number of objects to skip in the data stream, wherein the number of objects defines a resumption point of processing of the data stream by the presentation device; and
   repositioning the data stream for the presentation device starting at the resumption point.

6. The method of claim 1 wherein the repositioning step further comprises:
   receiving a selected page-level repositioning command, wherein the page-level repositioning command identifies a page at which to reposition the data stream;
   determining whether the identified page is an appropriate resumption point for starting processing of the data stream by comparing the identified page to adjacent user-created boundaries in the data stream; and
   repositioning the data stream for the presentation device starting at an adjacent user-created boundary if the identified page is not an appropriate resumption point.

7. A method for processing a data stream, the method comprising:
   receiving a data stream comprising user-created boundaries that are each defined in an Advance Function Presentation (AFP) Begin Named Group (BNG) structured field, wherein each boundary is a non-printing portion of the data stream that does not alter presentation data for the data stream;
   receiving input that selects one of the user-created boundaries in the data stream; repositioning the data stream for a presentation device to start processing from the selected user-created boundary;
   presenting the data stream on the presentation device starting from the selected user-created boundary;
   receiving user input defining a search criterion for an object in the data stream;
   locating a boundary for the object matching the search criterion; and
   repositioning the data stream for the presentation device starting from the boundary for the object.

8. A system for presenting a data stream, the system comprising:
   an interface adapted to receive a data stream comprising user-created boundaries that are each defined in an Advance Function Presentation (AFP) Begin Named Group (BNG) structured field, wherein each boundary is a non-printing portion of the data stream that does not alter presentation data for the data stream;
   a controller adapted to receive input selecting one of the user-created boundary in the data stream, and to reposition the data stream starting at the selected user-created boundary; and
   a presentation device for presenting the data stream starting from the selected user-created boundary,
   wherein the controller is further adapted to receive a page-level repositioning command, wherein the page-level repositioning command identifies a page at which to reposition the data stream, and the controller is further adapted to reposition the data stream for the presentation device starting from the user-created boundary adjacent to the page identified by the page-level repositioning command.

9. The system of claim 8 wherein the presentation device comprises a printer adapted to print the data stream on a printable medium starting from the selected user-created boundary.

10. The system of claim 8 wherein the presentation device comprises a printer adapted to print the data stream on a printable medium starting from the selected user-created boundary, and the controller comprises a printer controller of the printer.

11. The system of claim 8 wherein the presentation device comprises a printer and the controller comprises a print server coupled to the printer.

12. The system of claim 8 wherein the data stream comprises a plurality of objects, and the controller is further adapted to receive user input specifying a number of objects to skip in the data stream, wherein the number of objects defines a resumption point of presentation of the data stream by the presentation device, and the controller is further adapted to reposition the data stream for the presentation device starting from the resumption point.

13. The system of claim 8 wherein the controller is further adapted to receive a page-level repositioning command, wherein the page-level repositioning command identifies a page at which to reposition the data stream, and the controller is further adapted to determine whether the identified page is an appropriate resumption point for presentation of the data stream by comparing the identified page to adjacent user-created boundaries in the data stream, and further adapted to reposition the data stream for the presentation device starting at an adjacent user-created boundary if the identified page is not an appropriate resumption point.

14. A system for presenting a data stream, the system comprising:
- an interface adapted to receive a data stream comprising user-created boundaries that are each defined in an Advance Function Presentation (AFP) Begin Named Group (BNG) structured field, wherein each boundary is a non-printing portion of the data stream that does not alter presentation data for the data stream;
- a controller adapted to receive input selecting one of the user-created boundary in the data stream, and to reposition the data stream starting at the selected user-created boundary; and
- a presentation device for presenting the data stream starting from the selected user-created boundary,
- wherein the data stream comprises a plurality of objects, and the controller is further adapted to receive user input defining a search criterion for an object in the data stream and locate a boundary for the object matching the search criterion, and the controller is further adapted to reposition the data stream for the presentation device starting from the boundary which includes the criterion.

* * * * *